United States Patent
Chen et al.

(10) Patent No.: US 12,098,804 B2
(45) Date of Patent: Sep. 24, 2024

(54) FIXING DEVICE

(71) Applicants: Inventec (Pudong) Technology Corporation, Shanghai (CN); INVENTEC CORPORATION, Taipei (TW)

(72) Inventors: ChihJung Chen, Taipei (TW); ChengHung Tsai, Taipei (TW); HungChun Chen, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 82 days.

(21) Appl. No.: 18/181,582

(22) Filed: Mar. 10, 2023

(65) Prior Publication Data
US 2024/0159351 A1 May 16, 2024

(30) Foreign Application Priority Data
Nov. 11, 2022 (CN) .......................... 202211412327.0

(51) Int. Cl.
*F16M 13/02* (2006.01)
(52) U.S. Cl.
CPC .................... *F16M 13/02* (2013.01)

(58) Field of Classification Search
CPC ..................................................... F16M 13/02
USPC ............................................. 248/205.1, 558
See application file for complete search history.

(56) References Cited

U.S. PATENT DOCUMENTS

| | | | |
|---|---|---|---|
| 9,072,379 B2 * | 7/2015 | Cassidy | H05K 5/0204 |
| 12,019,468 B2 * | 6/2024 | Lin | G09F 7/06 |
| 2015/0097102 A1 * | 4/2015 | Cassidy | F16M 11/38 248/371 |
| 2022/0121238 A1 * | 4/2022 | Lin | G06F 1/1601 |

* cited by examiner

Primary Examiner — Anita M King
(74) Attorney, Agent, or Firm — CKC & Partners Co., LLC

(57) ABSTRACT

A fixing device includes a first fixing piece, a second fixing piece, a room, a cover, a first embedded piece and a second embedded piece. The first fixing piece is on a first surface of a first housing and includes some first fixing holes. The second fixing piece is on a second surface of the first housing and includes some second fixing holes. The room includes is disposed on an edge adjacent to the first and the second surfaces. The cover covers the opening and includes some through holes. The first embedded piece is on a third surface of a second housing and includes some hooks. The second embedded piece is on the third surface and includes an extension arm. When the hooks respectively extend into the first or the second fixing holes, the extension arm penetrates into the room through the through holes.

10 Claims, 18 Drawing Sheets

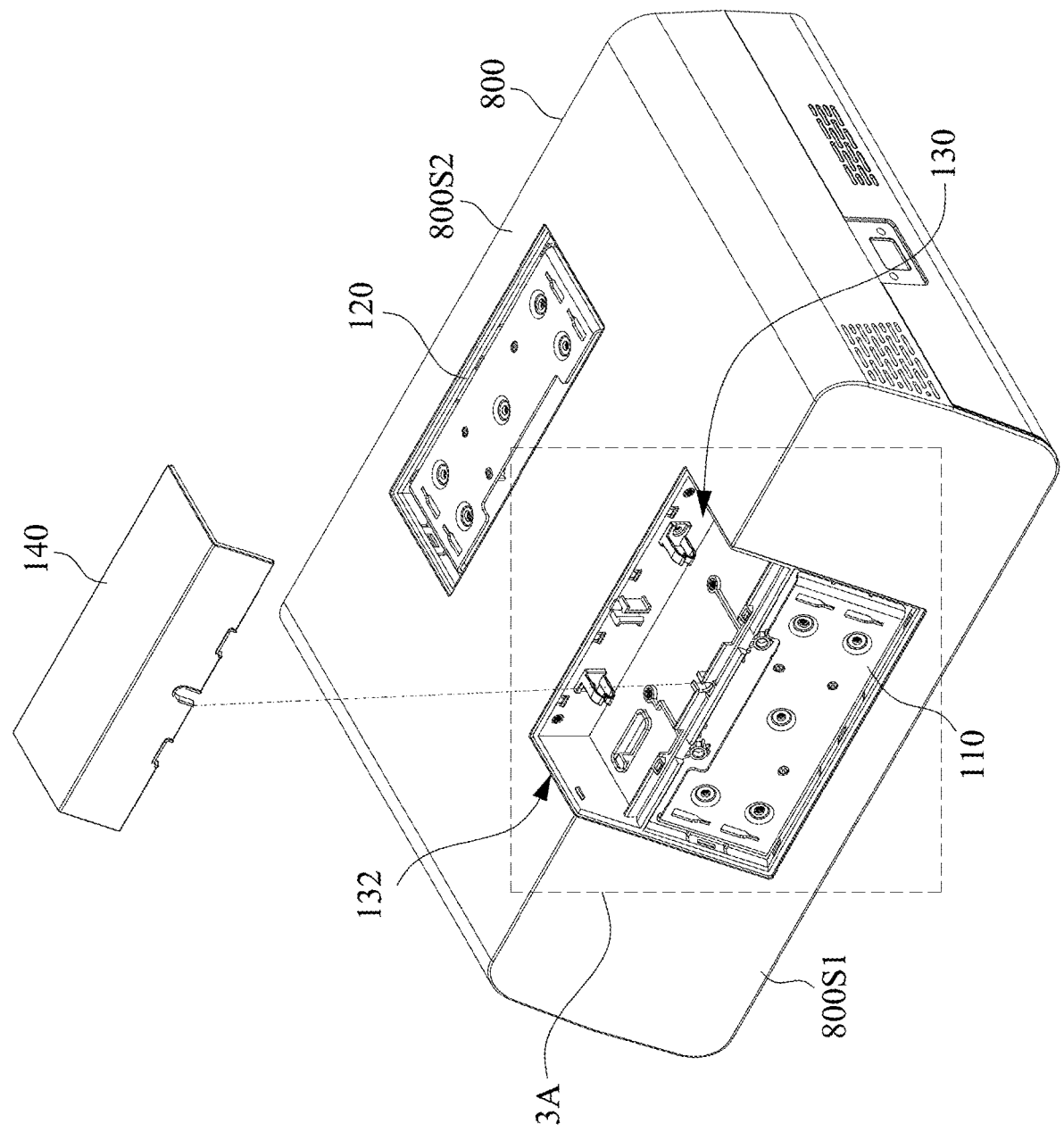

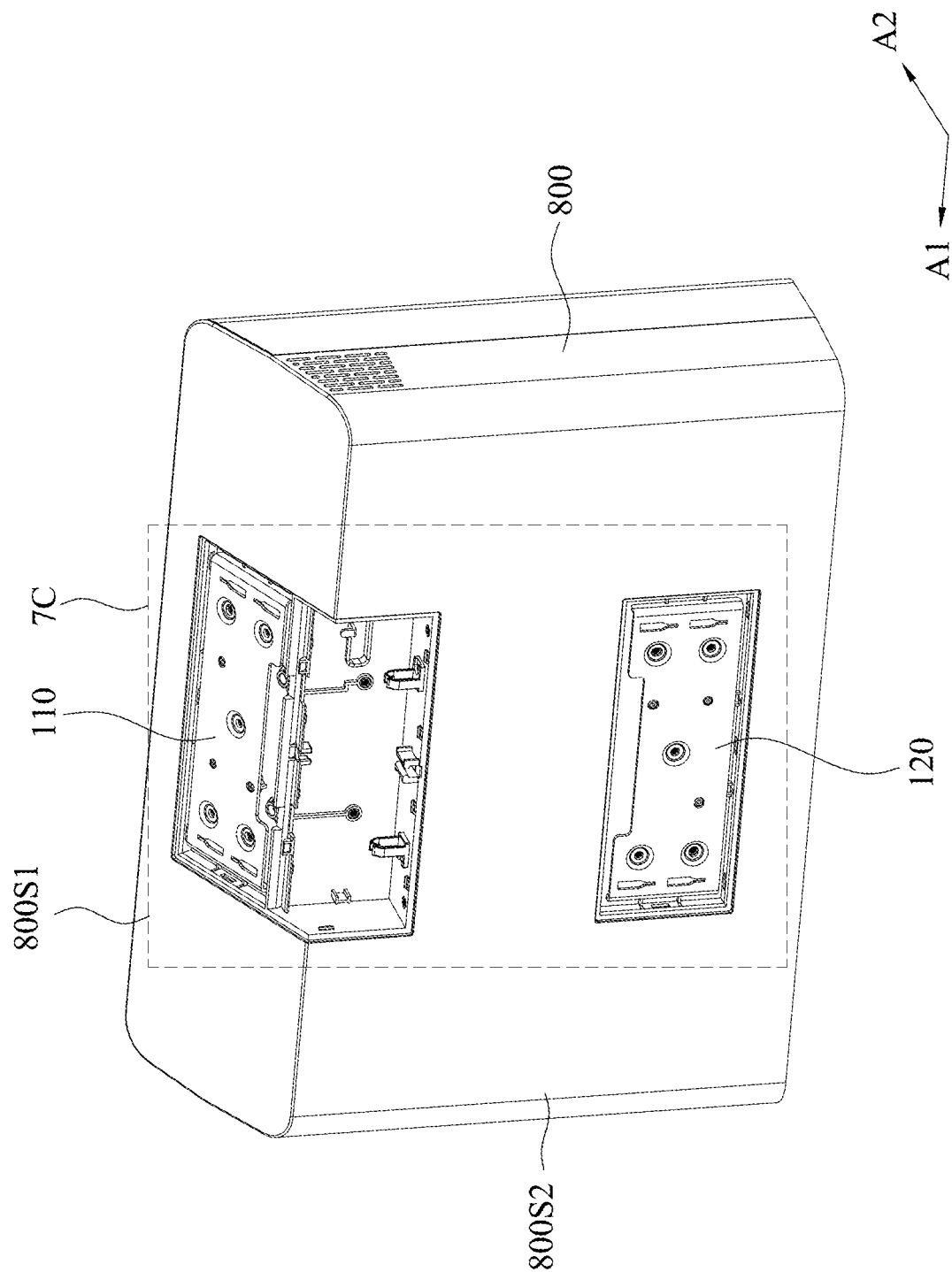

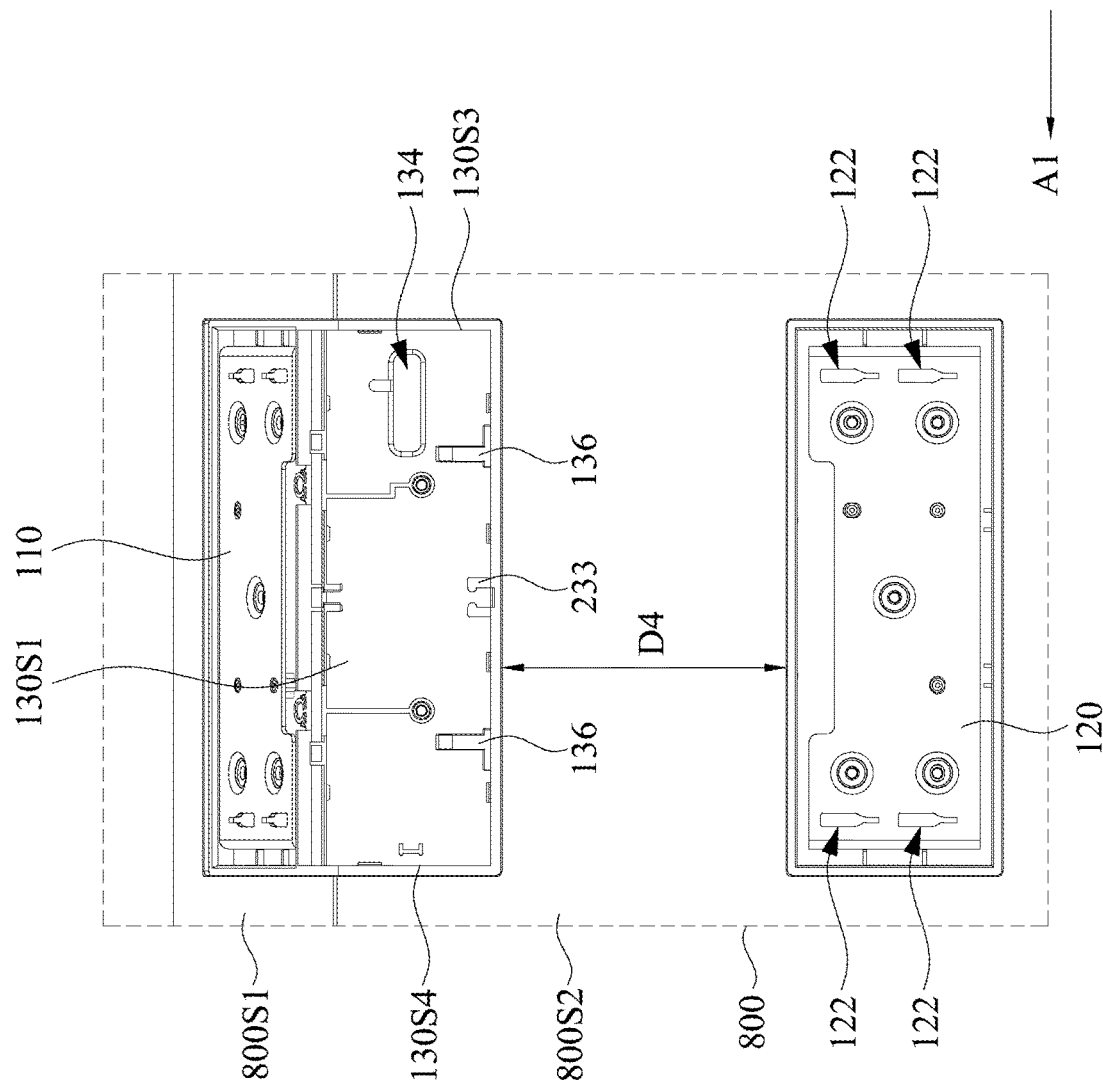

FIXING DEVICE

RELATED APPLICATIONS

This application claims priority to Chinese Application Serial Number 202211412327.0 filed Nov. 11, 2022, which is herein incorporated by reference.

BACKGROUND

Technical Field

The present disclosure relates to fixing devices.

Description of Related Art

With the popularity of technological devices, screens and computers are used in many different environments. In order to cope with these different usage scenarios, casings and brackets for assisting in fixing the screen and the computer are accordingly developed. For example, the monitor and its computer bracket used in the medical environment need to provide users with a suitable and stable operating angle, in order to facilitate the operator to read the information on the screen, and at the same time have waterproof function to avoid the electronic elements of the computer from getting damped and short-circuited when using in the medical environment.

Therefore, how to propose a fixing device that can solve the problems above is one of the problems that the industry is eager to invest resources of research and development to solve.

SUMMARY

A technical aspect of the present disclosure is to provide a fixing device, which can effectively solve the problems as mentioned above.

According to an embodiment of the present disclosure, a fixing device includes a first fixing piece, a second fixing piece, an accommodation room, a first cover, a first embedded piece and a second embedded piece. The first fixing piece is disposed on a first surface of a first housing. The first fixing piece includes a plurality of first fixing holes. The second fixing piece is disposed on a second surface of the first housing. The second fixing piece includes a plurality of second fixing holes. The accommodation room is disposed on an edge adjacent to the first surface and the second surface. The accommodation room includes an opening extending on the first surface and the second surface. The first cover covers the opening. The first cover includes a plurality of through holes. The first embedded piece is disposed on a third surface of a second housing. The first embedded piece includes a plurality of hooks. The second embedded piece is disposed on the third surface. The second embedded piece includes an extension arm. When the hooks respectively extend into the first fixing holes or the second fixing holes, the extension arm penetrates into the accommodation room through the through holes.

In one or more embodiments of the present disclosure, the second housing further includes a cable. The cable penetrates into the accommodation room through one of the through holes and penetrates into the first housing through a cable hole of the accommodation room.

In one or more embodiments of the present disclosure, the accommodation room further includes a plurality of flexible fixing columns. The flexible fixing columns are disposed in the accommodation room and clamp the cable.

In one or more embodiments of the present disclosure, when the second housing and the first housing are assembled as a first position, the hooks of the first embedded piece extend into the first fixing holes, and the extension arm extends into the accommodation space from the through holes located on the first surface.

In one or more embodiments of the present disclosure, the extension arm is fixed in the accommodation room and on an inner surface adjacent to the first surface.

In one or more embodiments of the present disclosure, the fixing device further includes a second cover. The second fixing piece is covered by the second cover.

In one or more embodiments of the present disclosure, when the second housing and the first housing are assembled as a second position, the hooks of the first embedded piece extend into the second fixing holes, and the extension arm extends into the accommodation space from the through holes located on the second surface.

In one or more embodiments of the present disclosure, the extension arm is fixed in the accommodation room and on an inner surface adjacent to the second surface.

In one or more embodiments of the present disclosure, the fixing device further includes a second cover. The first fixing piece is covered by the second cover.

In one or more embodiments of the present disclosure, an included angle between the first surface and the second surface is larger than 90 degrees.

The above-mentioned embodiments of the present disclosure have at least the following advantages: through the matching of the first fixing piece, the second fixing piece, the accommodation room disposed on the first housing and the first embedded piece and the second embedded piece disposed on the second housing, the first housing and the second housing can be assembled with each other as the first position or the second position. In the assembly as the first position, the first housing and the second housing are suitable to be placed on a table. At this point, the first surface of the first housing abuts against the second housing. Since there is an included angle between the first surface and the second surface, when the second housing includes a display screen, this included angle helps a user to read the screen information or operate the screen. In the assembly as the second position, the first housing and the second housing are suitable to be disposed on a wall. At this point, the second surface of the first housing abuts against the second housing. When the first housing is disposed on a wall while the second housing includes a display screen, the first housing and the second housing can be used as a wall-mounted screen. In either assembly as the first position or the second position, the hooks of the first embedded piece can be embedded into the fixing holes of the first fixing piece or the second fixing piece. The second embedded piece is embedded into the accommodation room. Moreover, the accommodation room can be used to accommodate the cable, and the electronic elements respectively located in the first housing and the second housing can be electrically connected by the cable. On the other hand, the first cover and the second cover of the fixing device respectively cover the accommodation room exposed and the first fixing piece, the second fixing piece. In this way, the cable in the accommodation room can be prevented from contacting with water or other liquids, which may otherwise cause short circuit.

BRIEF DESCRIPTION OF THE DRAWINGS

The disclosure can be more fully understood by reading the following detailed description of the embodiments, with reference made to the accompanying drawings as follows:

FIG. 2B is a schematic view of the first housing of FIG. 2A, in which the first cover and the second covers are removed;

FIG. 7B is a schematic view of the first housing of FIG. 7A, in which the first cover and the second covers are removed;

FIG. 7C is a regionally enlarged view of the zone 7C in FIG. 7B;

DETAILED DESCRIPTION

Figure 1A:
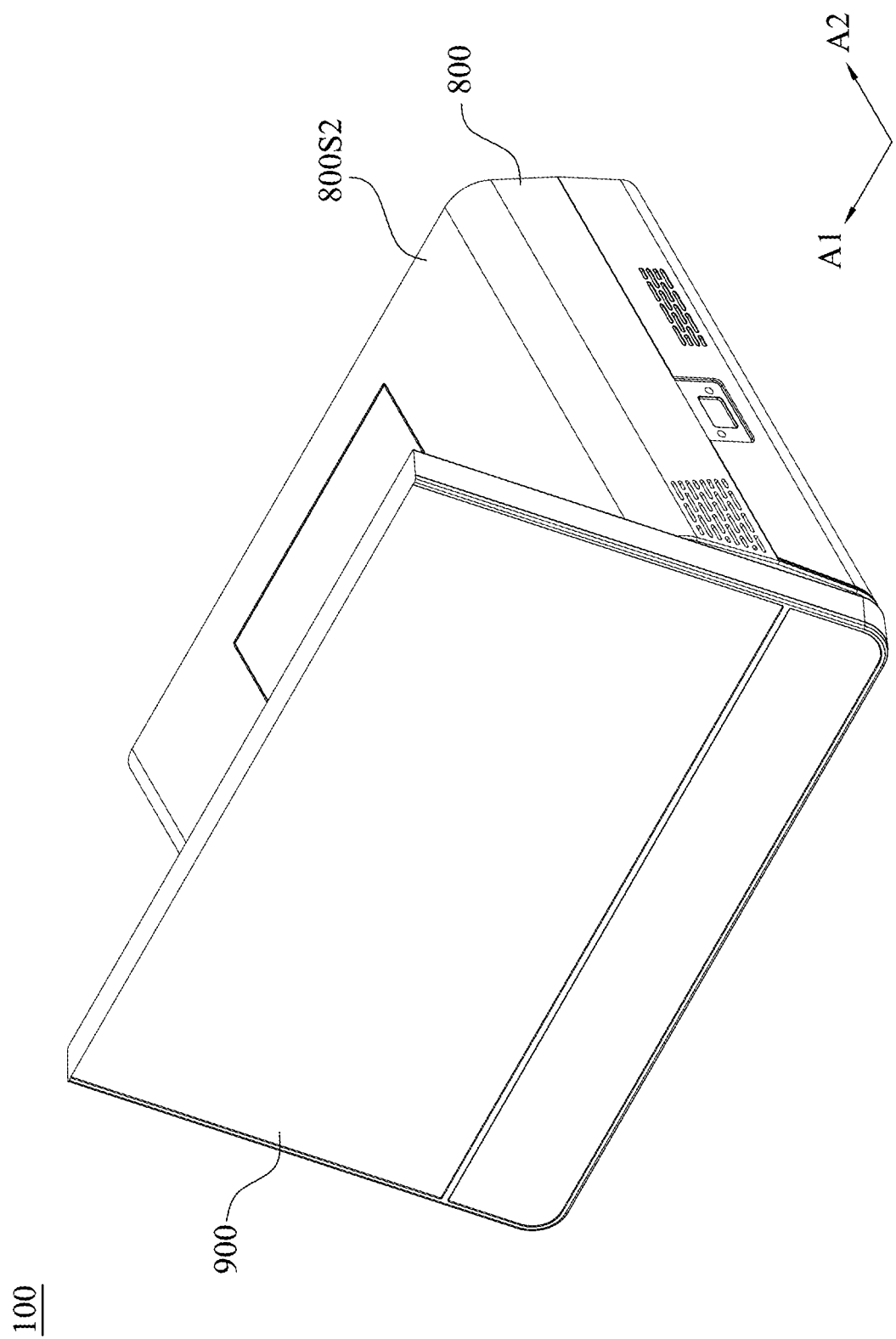
FIG. 1A is a schematic view of a fixing device according to some embodiments of the present disclosure, in which the first housing and the second housing are assembled as a first position.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1B:
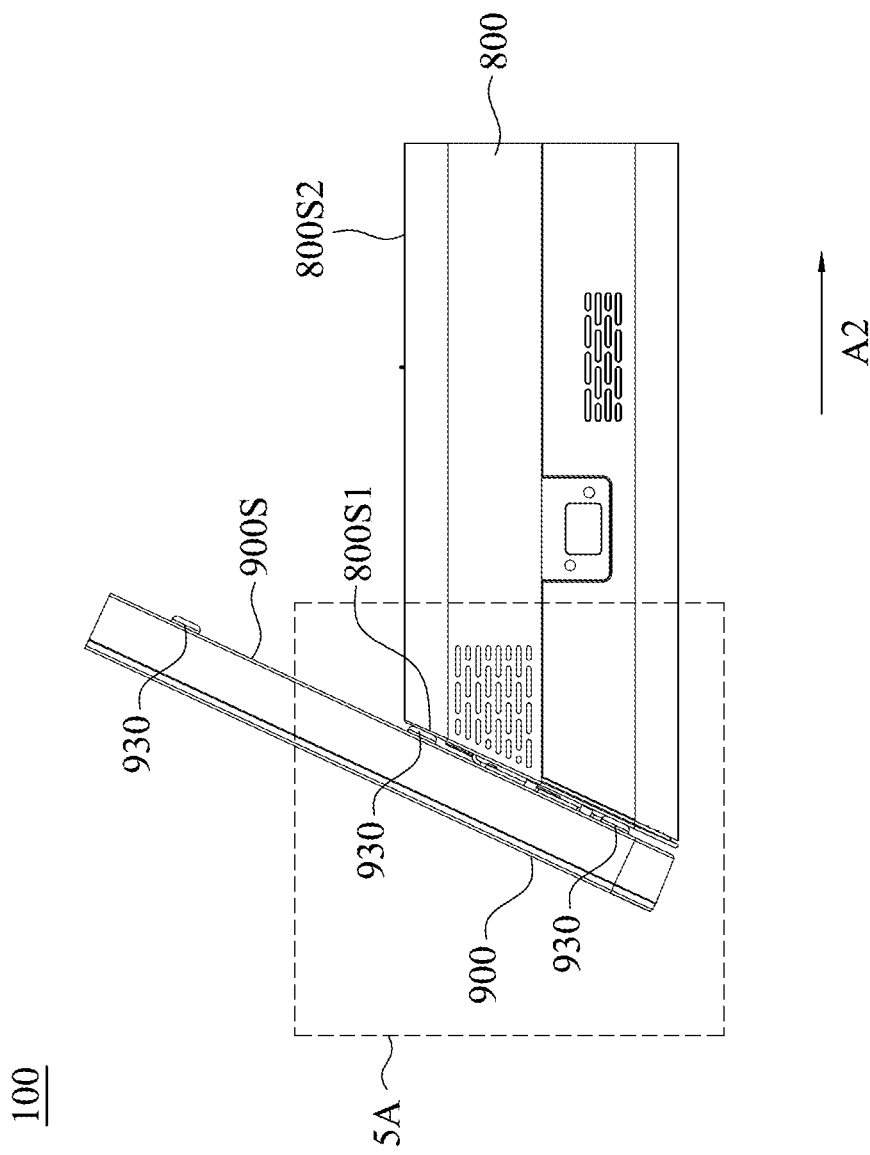
FIG. 1B is a side view of the fixing device along the first direction in FIG. 1A.
Figure 3A:
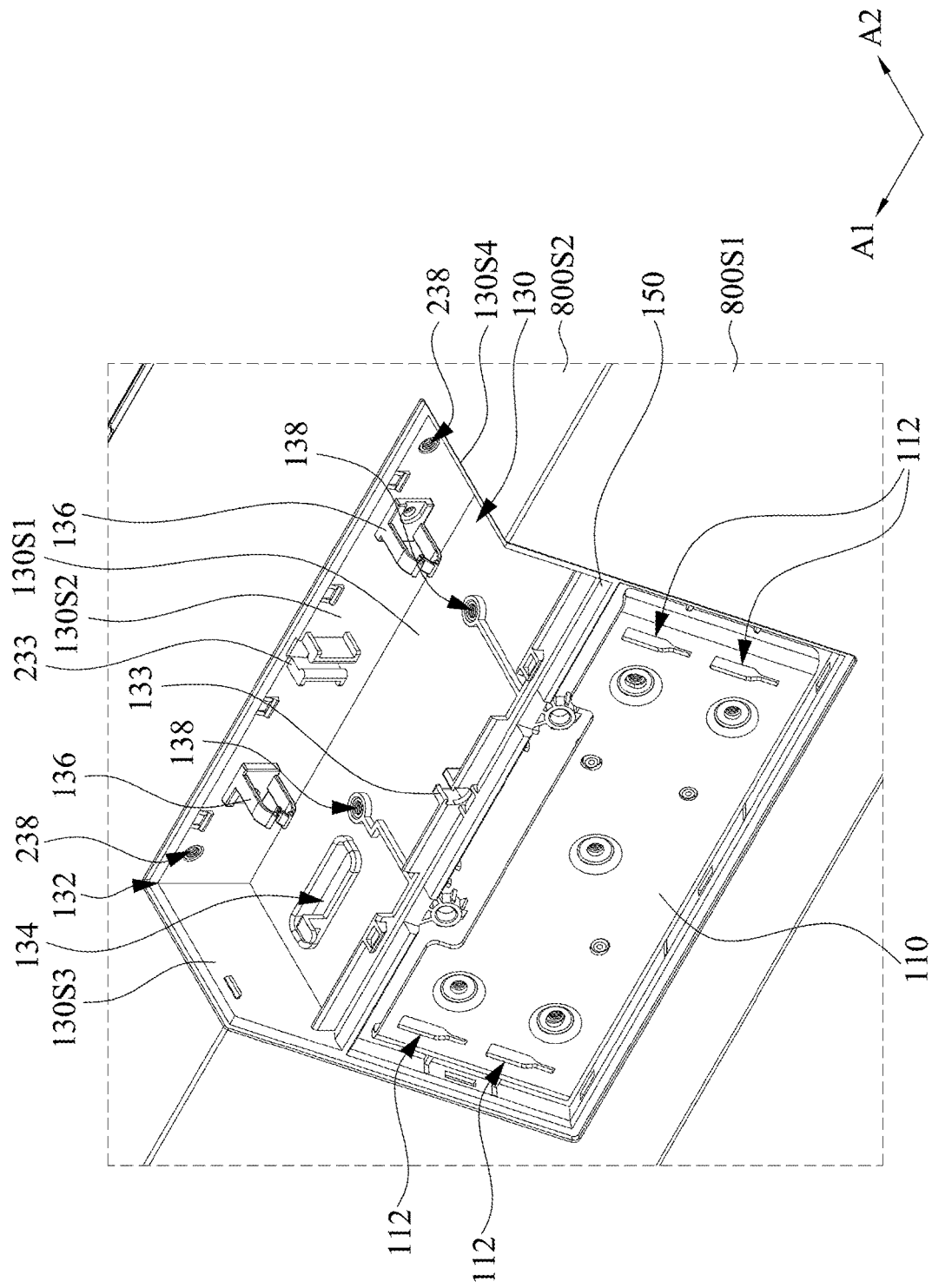
FIG. 3A is a regionally enlarged view of the zone 3A in FIG. 2B.
Figure 4:
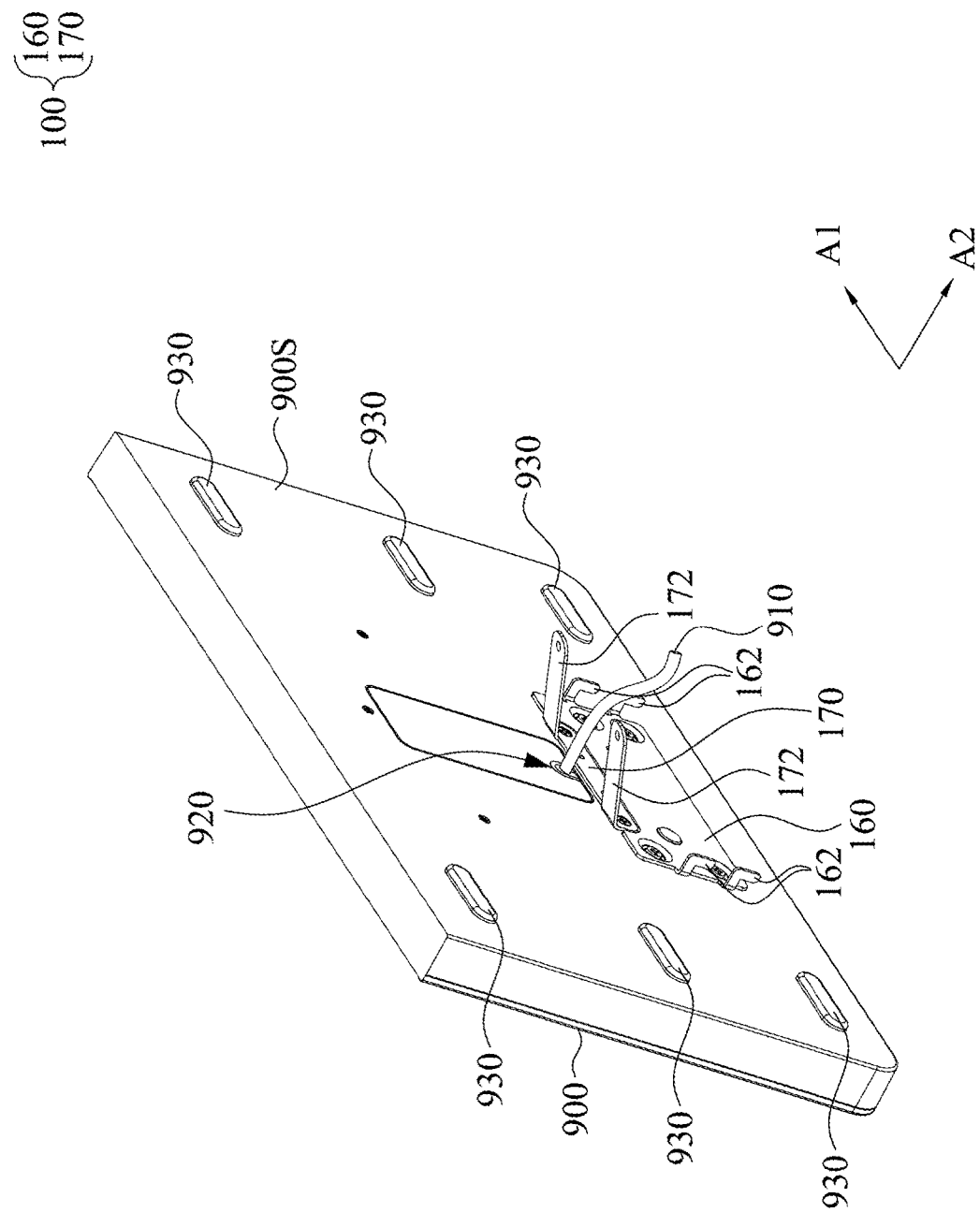
FIG. 4 is a schematic view of a second housing according to some embodiments of the present disclosure.

FIG. 1A is a schematic view of a fixing device 100 according to some embodiments of the present disclosure, in which the first housing 800 and the second housing 900 are assembled as a first position. FIG. 1B is a side view of the fixing device 100 along the first direction A1 in FIG. 1A. Reference is made to FIGS. 1A and 1B. Some embodiments of the disclosure is related to a fixing device 100 used to fix a first housing 800 and a second housing 900. The fixing device 100 includes a first fixing piece 110, a second fixing piece 120, an accommodation room 130, a first cover 140, a first embedded piece 160 and a second embedded piece 170. These elements will be illustrated in the following figures. To be specific, the first fixing piece 110, the second fixing piece 120, the accommodation room 130 and the first cover 140 are located on the first housing 800 (as shown in FIG. 3A), while the first embedded piece 160 and the second embedded piece 170 are located on the second housing 900 (as shown in FIG. 4).

Figure 6A:
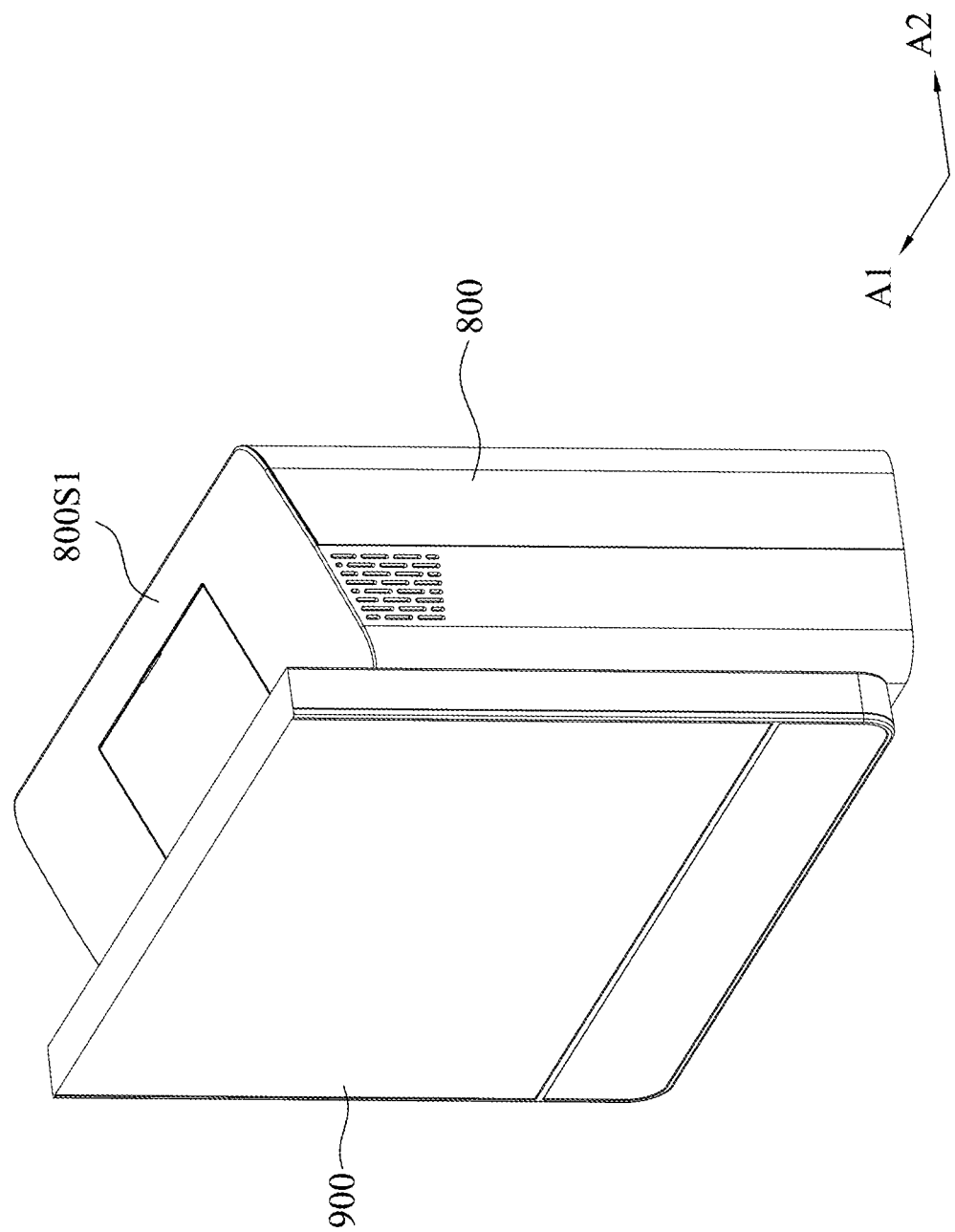
FIG. 6A is a schematic view of a fixing device according to some embodiments of the present disclosure, in which the first housing and the second housing are assembled as a second position.
Figure 6B:
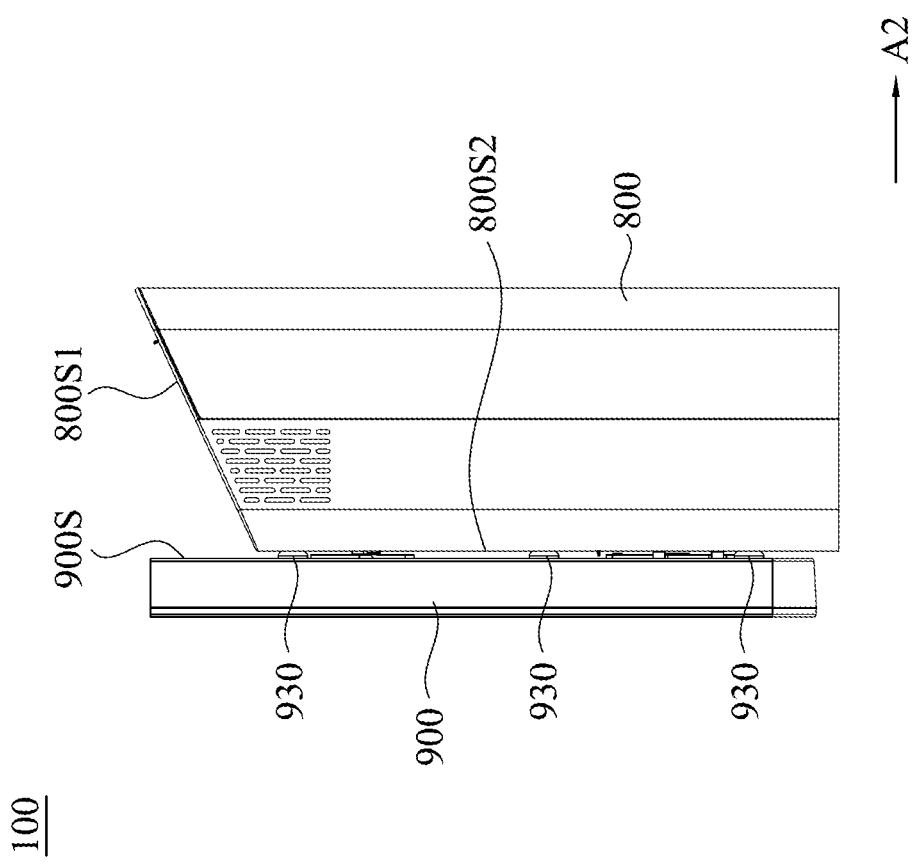
FIG. 6B is a side view of the fixing device along the first direction in FIG. 6A.

In the embodiment as shown in FIGS. 1A and 1B, the first housing 800 and the second housing 900 are respectively a host computer and a touch screen. However, in other embodiments, the first housing 800 and the second housing 900 can accommodate other different devices or can be a part of other different devices. To be clear, in FIGS. 1A and 1B, the first housing 800 and the second housing 900 are assembled as a first position. To be specific, the fixing device 100 provides two positions of assembly of the first housing 800 and the second housing 900. When the first housing 800 and the second housing 900 are assembled as a first position, the second housing 900 abuts against a first surface 800S1 of the first housing 800. When the first housing 800 and the second housing 900 are assembled as a second position (as shown in FIGS. 6A and 6B), the second housing 900 abuts against a second surface 800S2 of the first housing 800. In this way, the fixing device 100 can provide multiple ways of assembly of the first housing 800 and the second housing 900, which expands the usage scenarios of the first housing 800 and the second housing 900. For example, in the assembly as the first position, the first housing 800 and the second housing 900 can be placed on a table. In the assembly as the second position, the first housing 800 and the second housing 900 can be placed on a wall. Details of the two different positions of assembly of the fixing device 100 are described below.

Figure 2A:
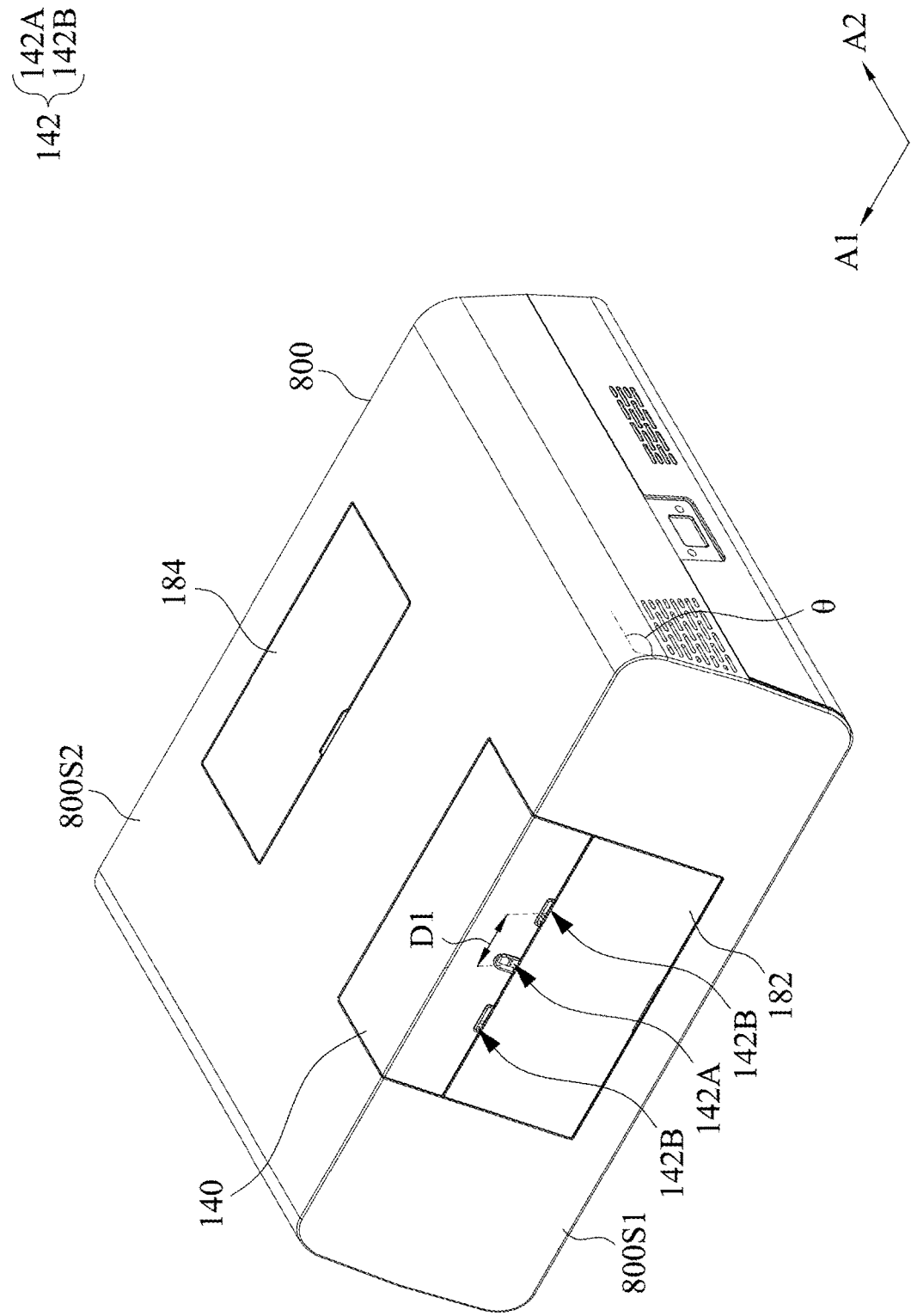
FIG. 2A is a schematic view of a first housing according to some embodiments of the present disclosure.

FIG. 2A is a schematic view of a first housing 800 according to some embodiments of the present disclosure. FIG. 2B is a schematic view of the first housing 800 of FIG. 2A, in which the first cover 140 and the second covers 182, 184 are removed. Reference is made to FIGS. 2A and 2B. The first housing 800 has the first surface 800S1 and the second surface 800S2 adjacent to the first surface 800S1. The first fixing piece 110 is disposed on the first surface 800S1 of the first housing 800, and the second fixing piece 120 is disposed on the second surface 800S2 of the first housing 800. The accommodation room 130 is disposed on an edge adjacent to the first surface 800S1 and the second surface 800S2. The accommodation room 130 includes an opening 132 extending on the first surface 800S1 and the second surface 800S2. The first cover 140 includes a plurality of through holes 142 and covers the opening 132. To be clear, in the embodiment as shown, the through holes 142 include a cable through hole 142A and two extension arm through holes 142B. There is a distance D1 between the cable through hole 142A and one of the extension arm through holes 142B. Moreover, the shapes of the cable through hole 142A and the extension arm through holes 142B are different. For example, in the view angle in a second direction A2, the cable through hole 142A has a circular shape while each of the extension through holes 142B has a rectangular shape. However, in other embodiments, the through holes 142 can be of other different shapes. Moreover, in this embodiment, an included angle θ between the first surface 800S1 and the second surface 800S2 is larger than 90 degrees. The included angle θ larger than 90 degrees can provide a suitable angle to a user for operating the screen (i.e., the second housing 900). However, in other embodiments, the specific magnitude of the included angle θ between the first surface 800S1 and the second surface 800S2 can be made according to the actual situations of the user.

Please keep referring to FIGS. 2A and 2B. In this embodiment, the first housing 800 further includes second covers 182, 184, which respectively cover the first fixing piece 110 and the second fixing piece 120. The purpose to dispose the first cover 140 and the second covers 182, 184 is to avoid the first fixing piece 110, the second fixing piece 120 in the accommodation room 130 from contacting with water or other liquids. The materials of the first fixing piece 110 and the second fixing piece 120 include metal. In this case, if contacted with water or other liquids, the service lives of the first fixing piece 110 and the second fixing piece 120 may be reduced. The accommodation room 130 accommodates metal (for example, the extension arms 172 of the second embedded piece 170 in FIG. 4) or cable (for example, the cable 910 in FIG. 4) therein. In this case, if contacted with water or other liquids, the metallic element may be worn or the electric circuit may be dampen or short-circuited.

Figure 3B:
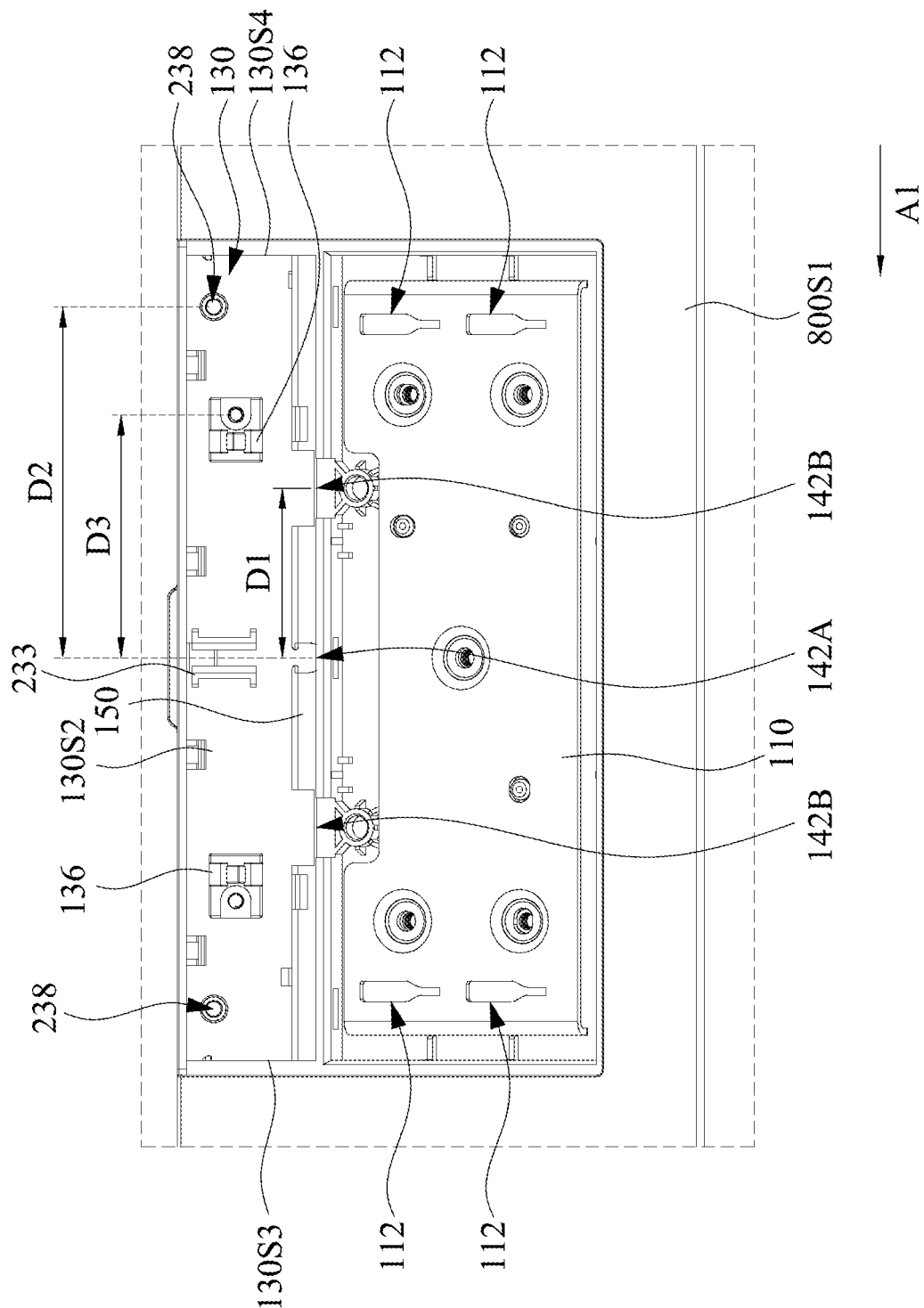
FIG. 3B is a side view of the fixing device along the second direction in FIG. 3A.
Figure 3C:
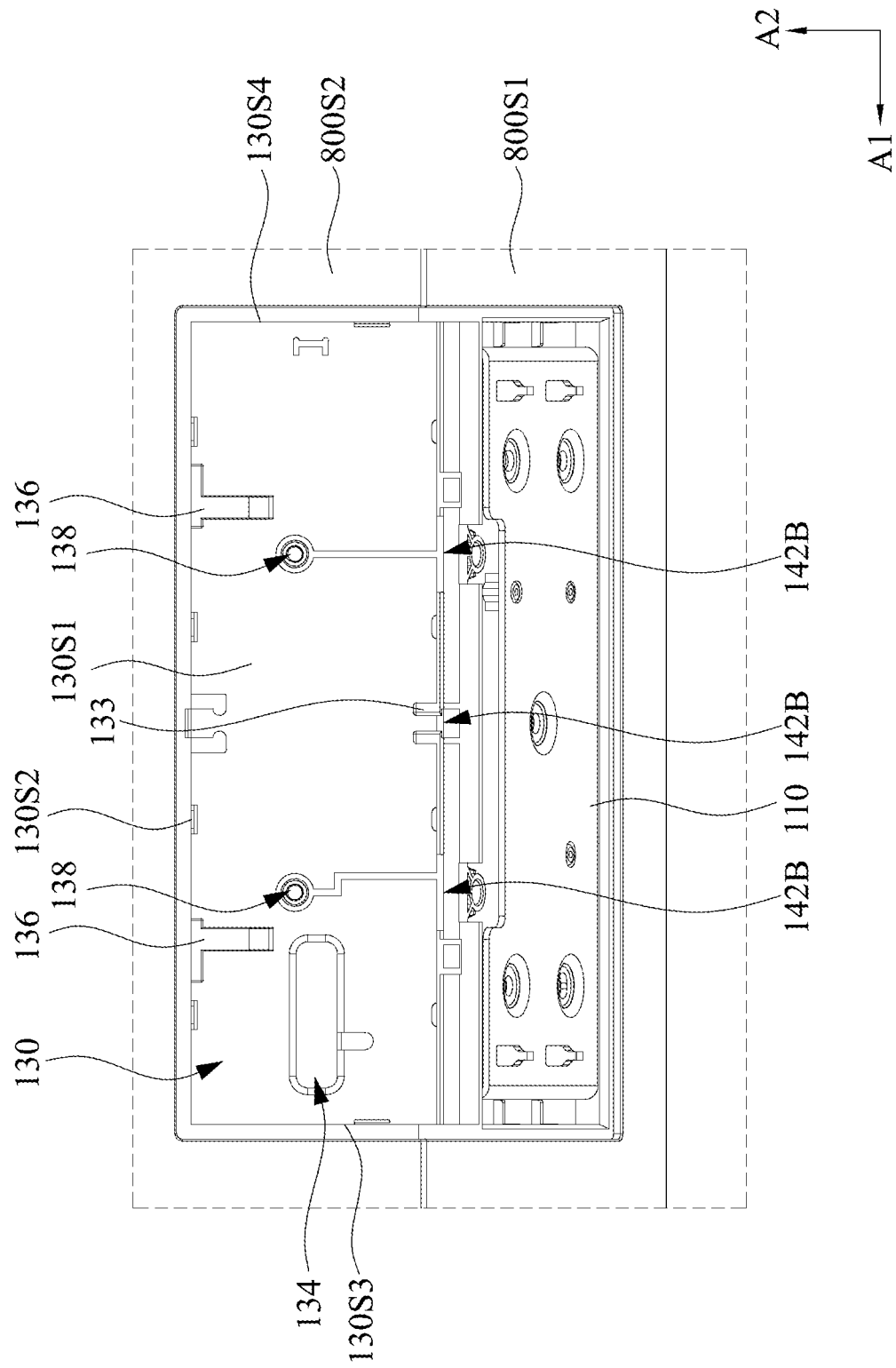
FIG. 3C is a top view of the fixing device of FIG. 3A.

FIG. 3A is a regionally enlarged view of the zone 3A in FIG. 2B. FIG. 3B is a side view of the fixing device 100 along the second direction A2 in FIG. 3A. FIG. 3C is a top view of the fixing device 100 of FIG. 3A. Reference is made to FIGS. 3A to 3C. The first fixing piece 110 includes a plurality of first fixing holes 112. For example, in the embodiment as shown, the first fixing piece 110 has four first fixing holes 112. Each of the first fixing holes 112 includes a wide portion and a narrow portion communicated to the wide portion. Each of the wide portions and the corresponding narrow portion are connected with each other through inclined surfaces. Moreover, the wide portion of each of the first fixing holes 112 is close to the accommodation room 130, while the narrow portion is away from the accommodation room 130. However, in other embodiments, the first fixing holes 112 can be of other shapes according to the actual situation. On the other hand, two of the four first fixing holes 112 are respectively distributed to two opposite edges of the first fixing piece 110, the purpose of which is to balance the action forces, such that the first housing 800 and the second housing 900 are fixed to each other in a more stable manner. However, in other embodiments, the first fixing holes 112 can be distributed in other positions of the first fixing piece 110 according to the actual situation.

Figure 5A:
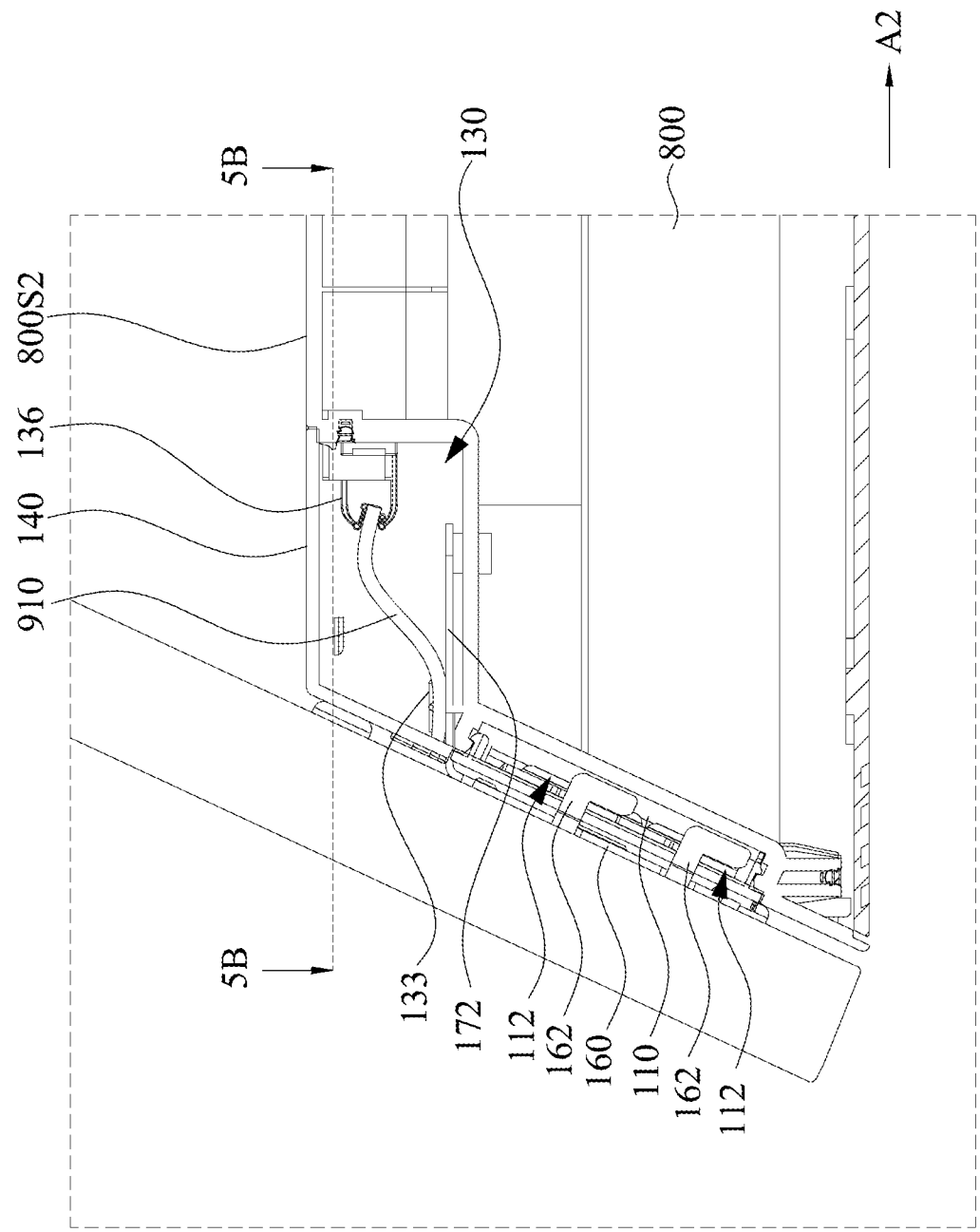
FIG. 5A is a regionally enlarged view of the zone 5A in FIG. 1B.
Figure 5B:
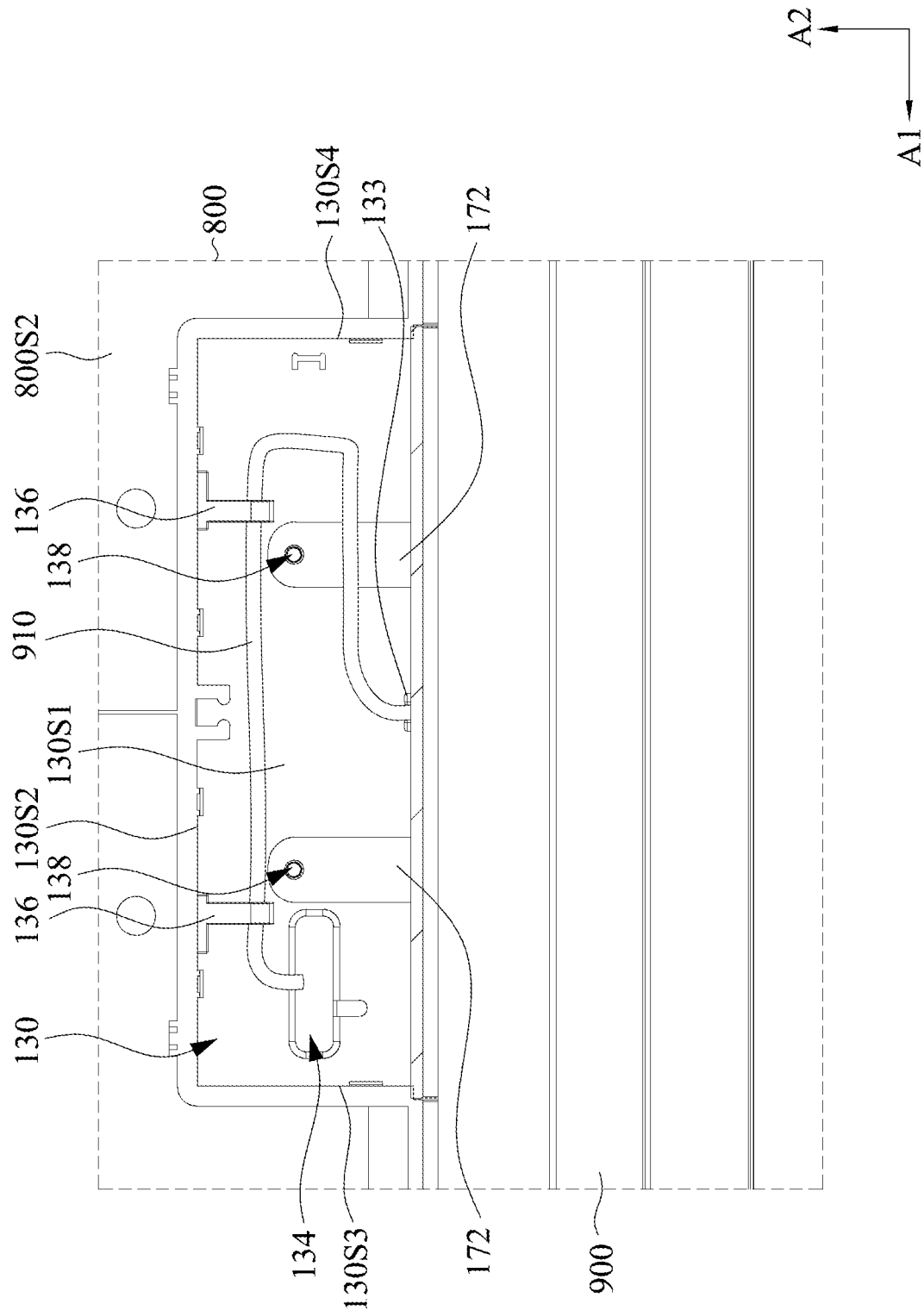
FIG. 5B is a sectional view along the sectional line 5B-5B in FIG. 5A.

Please keep referring to FIGS. 3A to 3C. In the embodiment as shown, the accommodation room 130 can be used to accommodate the cable 910 and to fix the second embedded piece 170 as shown in FIG. 4. The accommodation room 130 includes a multiple of inner surfaces 130S1, 130S2, 130S3, 130S4. The inner surfaces 130S1, 130S2 are respectively adjacent to the first surface 800S1 and the second surface 800S2 of the first housing 800. The inner surfaces 130S3, 130S4 are two opposite surfaces in the accommodation room 130. In this embodiment, the accommodation room 130 further includes a plurality of flexible fixing columns 136. The flexible fixing columns 136 are disposed on the inner surface 130S2 in the accommodation room 130 and are configured to clamp the cable 910, as shown in FIGS. 5A and 5B. The accommodation room 130 further includes a cable hole 134. In this embodiment, the cable hole 134 is disposed on the inner surface 130S1. However, in other embodiments, the cable hole 134 can be disposed at other positions in the accommodation room 130 according to the actual situations of cabling. The cable hole 134 is used to communicate the accommodation room 130 and the inside of the first housing 800. The accommodation room 130 further includes a wall 150. The wall 150 is disposed at an edge adjacent to the accommodation room 130 and the first fixing piece 110. The through holes 142 of the first cover 140 correspondingly penetrate the wall 150. To be specific, the positions on the wall 150 corresponding to the cable through hole 142A and the extension arm through holes 142B are respectively of a circular shape and a rectangular shape, which are the same as the cable through hole 142A and the extension arm through holes 142B on the first cover 140. The purpose to dispose the wall 150 is to prevent water or other liquids from entering into the accommodation room 130 from the edge adjacent to the first cover 140 and the first fixing piece 110. Moreover, the position on the wall 150 corresponding to the cable through hole 142A is disposed with a trough 133. To be specific, the trough 133 extends into the accommodation room 130 along the second direction A2 from the cable through hole 142A. The trough 133 is configured to guide the cable 910 and to prevent the cable 910 from being over squeezed when bending, which may otherwise affect the effect of its electrical connection. Moreover, the accommodation room 130 further includes a plurality of inner-side fixing holes 138 (two inner fixing holes 138 in the embodiment as shown). The inner-side fixing holes 138 can be used to fix the extension arms 172 (the extension arms 172 in FIG. 4) extending into the accommodation room 130.

Please keep referring to FIGS. 3A to 3C. The trough 133 and the inner-side fixing holes 138 as previously discussed are used to assist the assembly of the first housing 800 and the second housing 900 as the first position. To be specific, in addition, the accommodation room 130 further includes a trough 233 and a plurality of inner-side fixing holes 238, which are used to assist the assembly of the first housing 800 and the second housing 900 as the second position. It is worth to note that, the inner-side fixing holes 138 and the inner-side fixing holes 238 are disposed in different positions. To be specific, in the embodiment as shown in FIGS. 3A to 3C, the inner-side fixing holes 138 are located on the inner surface 130S1 of the accommodation room 130, while the inner-side fixing holes 238 are located on the inner surface 130S2 of the accommodation room 130. The inner-side fixing holes 138 respectively correspond to the extension arm through holes 142B. Furthermore, as shown in FIG. 3B, in the side view along the second direction A2, taking the cable through hole 142A as a reference point, each of the extension arm through holes 142B (corresponding to the positions of the inner-side fixing holes 138) has a distance D1, each of the inner-side fixing holes 238 has a distance D2, and each of the flexible fixing columns 136 has a distance D3. The distance D2 is larger than the distance D3, and the distance D3 is larger than the distance D1. Moreover, the trough 133 and the inner-side fixing holes 138 in the assembly way as the first position are illustrated as FIGS. 5A and 5B. The trough 233 and the inner-side fixing holes 238 are to be discussed when illustrating the second positions in FIGS. 6A to 9B.

FIG. 4 is a schematic view of a second housing 900 according to some embodiments of the present disclosure.

Reference is made to FIG. 4. The first embedded piece 160 is disposed on a third surface 900S of the second housing 900. The first embedded piece 160 includes a plurality of hooks 162. In the embodiment as shown, the first embedded piece 160 includes four hooks 162. Two of the hooks 162 are respectively adjacent to two opposite edges disposed on the first embedded piece 160. Each of the hooks 162 bends to form a hooking portion after extending away from the second housing 900 by a certain distance along the second direction A2. To be specific, the positions where the hooks 162 are disposed on, correspond to the positions of the first fixing holes 112 in FIGS. 3A to 3C. Moreover, the second embedded piece 170 is disposed on the third surface 900S and includes a plurality of extension arms 172. In the embodiment as shown, the second embedded piece 170 includes two extension arms 172. The two extension arms 172 are respectively located on two opposite ends of the second embedded piece 170 and extend along the second direction A2 away from the second housing 900. On the other hand, the second housing 900 further includes the cable 910, a connecting hole 920 and a plurality of pads 930. To be specific, in the embodiment as shown in FIG. 4, the cable 910 penetrates out of the second housing 900 through the connecting hole 920 disposed on the third surface 900S and extends towards the second direction A2. In this embodiment, the second housing 900 includes six pads 930. All of the six pads 930 are disposed on the third surface 900S. Three of the pads 930 are respectively adjacent to two opposite edges disposed on the third surface 900S.

FIG. 5A is a regionally enlarged view of the zone 5A in FIG. 1B. FIG. 5B is a sectional view along the sectional line 5B-5B in FIG. 5A. Reference is made to FIG. 1B, FIG. 5A and FIG. 5B. When the first housing 800 and the second housing 900 are assembled as the first position, the first surface 800S1 of the first housing 800 abuts against the third surface 900S of the second housing 900. To be specific, the pads 930 located on the third surface 900S contact with the first surface 800S1. The pads 930 can provide cushioning, such that the first surface 800S1 and the third surface 900S do not rub against each other, and the weight of the second housing 900 is assisted to be evenly distributed on the first surface 800S1. When the hooks 162 respectively extend into the first fixing holes 112, the extension arms 172 penetrate into the accommodation room 130 through the through holes 142. To be specific, the hooks 162 of the first embedded piece 160 are correspondingly embedded into the first fixing holes 112 of the first fixing piece 110. In this embodiment, the way of assembly is to use the hooks 162 to penetrate through the wide portions (please see FIG. 3B) of the first fixing holes 112, and then slide along the inclines surfaces to the narrow portions of the first fixing holes 112, such that the hooks 162 are fixed. When the first fixing piece 110 and the first embedded piece 160 are assembled, the extension arms 172 extend into the accommodation room 130 at the same time and correspond to the locations of the inner-side fixing holes 138. In this embodiment, the inner-side fixing holes 138 and the extension arms 172 can be fixed by screws. The cable 910 extends into the accommodation room 130 and penetrates through the trough 133 and the flexible fixing columns 136 sequentially and then finally enters into the cable hole 134 to electrically connect with electronic elements in the first housing 800 and the second housing 900. After the cable 910 and the extension arms 172 are fixed, the first cover 140 is used to cover the accommodation room 130, and the assembly of the first housing 800 and the second housing 900 as the first position is completed. It is worth to note that, in the assembly as the first position, the second fixing piece 120 is covered by the second cover 184, to prevent the second fixing piece 120 from contacting with water or other liquids. In the assembly as the first position, the first housing 800 and the second housing 900 can be placed on a table. The included angle 9 between the first surface 800S1 and the second surface 800S2 can provide a suitable screen angle to a user, facilitating the user to read the information on the screen.

FIG. 6A is a schematic view of a fixing device 100 according to some embodiments of the present disclosure, in which the first housing 800 and the second housing 900 are assembled as a second position. FIG. 6B is a side view of the fixing device 100 along the first direction A1 in FIG. 6A. Reference is made to FIGS. 6A and 6B. In the assembly of the first housing 800 and the second housing 900 as the second position, the second surface 800S2 of the first housing 800 abuts against the third surface 900S of the second housing 900.

Figure 7A:
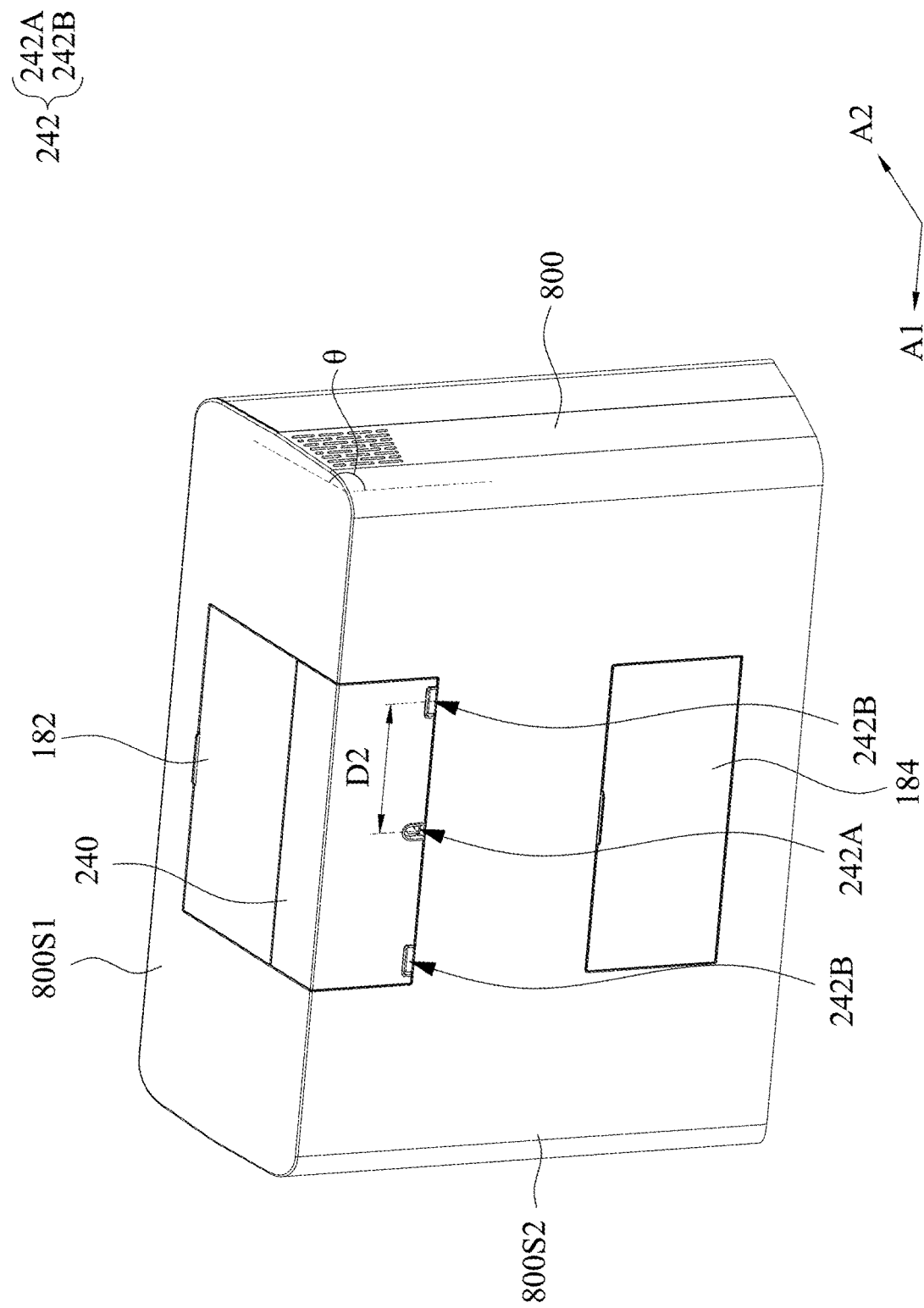
FIG. 7A is a schematic view of a first housing according to some embodiments of the present disclosure.

FIG. 7A is a schematic view of a first housing 800 according to some embodiments of the present disclosure. FIG. 7B is a schematic view of the first housing 800 of FIG. 7A, in which the first cover 140 and the second covers 182, 184 are removed. FIG. 7C is a regionally enlarged view of the zone 7C in FIG. 7B. Reference is made to FIGS. 7A to 7C. To be clear, the first housing 800 in FIGS. 7A to 7C is also disposed with the first fixing piece 110, the second fixing piece 120 and the accommodation room 130. The first fixing piece 110 and the accommodation room 130 are the same as the embodiment discussed in FIGS. 3A to 3C. On the other hand, similar to the first fixing piece 110 discussed in FIGS. 3A to 3C, the second fixing piece 120 includes a plurality of second fixing holes 122 (four second fixing holes 122 in this embodiment). Two of the second fixing holes 122 are respectively disposed at two opposite edges of the second fixing piece 120. To be specific, the first fixing holes 112 of the first fixing piece 110 and the second fixing holes 122 of the second fixing piece 120 have the same configuration, so as to correspond to the positions of the hooks 162 of the first embedded piece 160. Moreover, the second fixing piece 120 disposed on the second surface 800S2 is not adjacent to the accommodation room 130, and the two are spaced apart from each other by a distance D4.

Please keep referring to FIGS. 7A to 7C. To be specific, there are several differences between the first cover 240 covering the accommodation room 130 and the first cover 140 in FIG. 2A. Firstly, the through holes 142 of the first cover 140 are located on the first surface 800S1, while the through holes 242 of the first cover 240 are located on the second surface 800S2. Secondly, the through holes 242 include a cable through hole 242A and two extension arm through holes 242B. However, there is a distance D1 between the cable through hole 142A and each of the extension arm through holes 142B of the first cover 140 in FIG. 2A, while there is a distance D2 between the cable through hole 242A and each of the extension arm through holes 242B of the first cover 240 here, in which the distance D2 is larger than the distance D1. Reference is also made to FIG. 3B. The distance D2 between the cable through hole 242A and one of the extension arm through holes 242B corresponds to the distance D2 between the trough 233 and one of the inner-side fixing holes 238 in the accommodation room 130.

Figure 8:
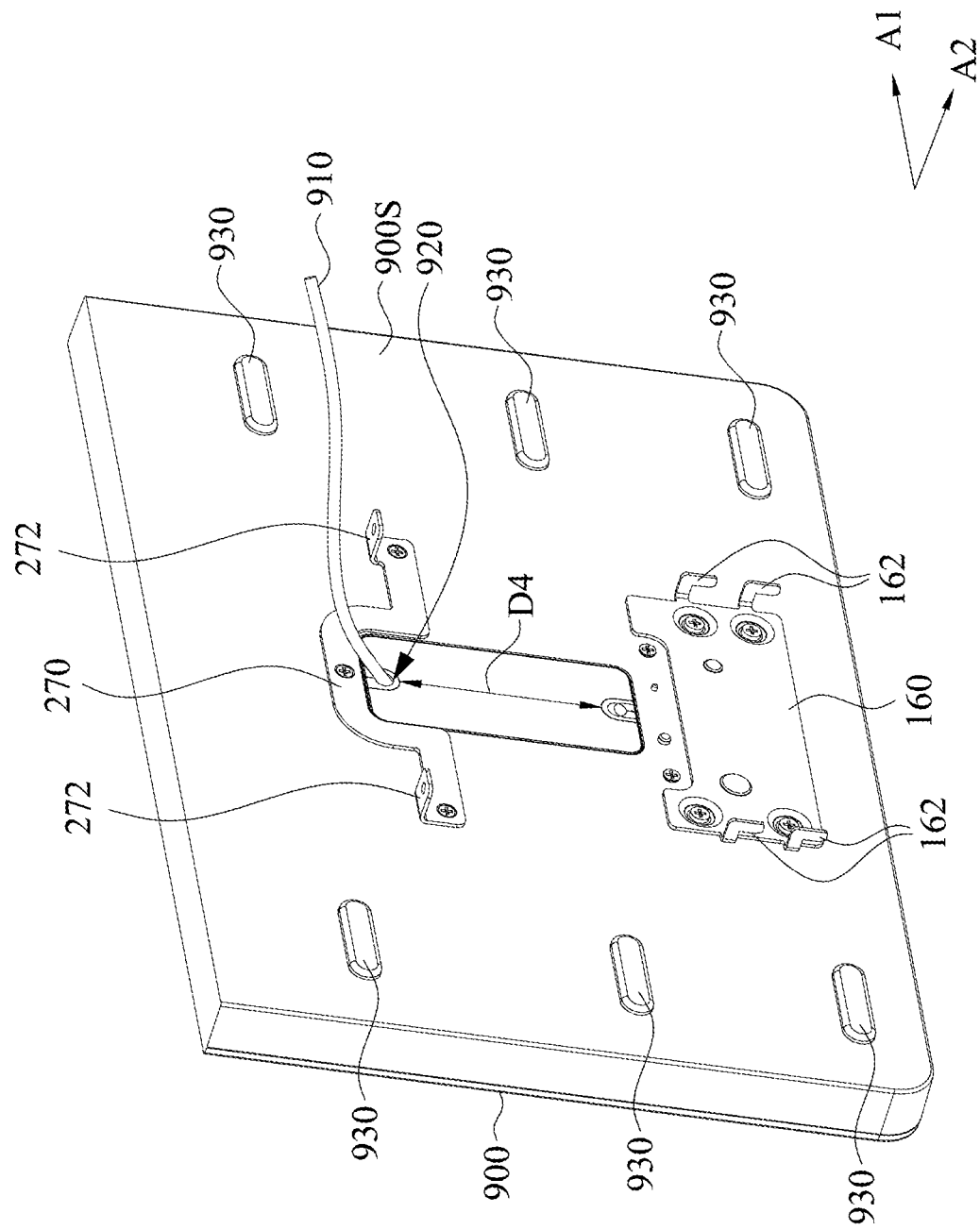
FIG. 8 is a schematic view of a second housing according to some embodiments of the present disclosure.

FIG. 8 is a schematic view of a second housing 900 according to some embodiments of the present disclosure. Reference is made to FIG. 8. The first embedded piece 160 installed on the second housing 900 is similar to the first embedded piece 160 as discussed in FIG. 4. Moreover, the second housing 900 also includes the cable 910, a connecting hole 920 and a plurality of pads 930. To be specific, the difference between the second housing 900 in FIG. 8 and the second housing 900 in FIG. 4 includes the position of the connecting hole 920 and the second embedded piece 270 used in different patterns. Reference is made to FIG. 4 and FIG. 8. To be specific, the location of the connecting hole 920 in FIG. 4 is close to the first embedded piece 160. However, the location of the connecting hole 920 in FIG. 8 is away from the first embedded piece 160. In this embodiment as shown, there is a distance D4 between the connecting hole 920 and the first embedded piece 160. Moreover, with the adjustment of the position of the connecting hole 920, the second embedded piece 270 is used. As compared to the extension arms 172 of the second embedded piece 170 in FIG. 4, the extension arms 272 of the second embedded piece 270 in FIG. 8 extend along the second direction A2 by a shorter distance.

Figure 9A:
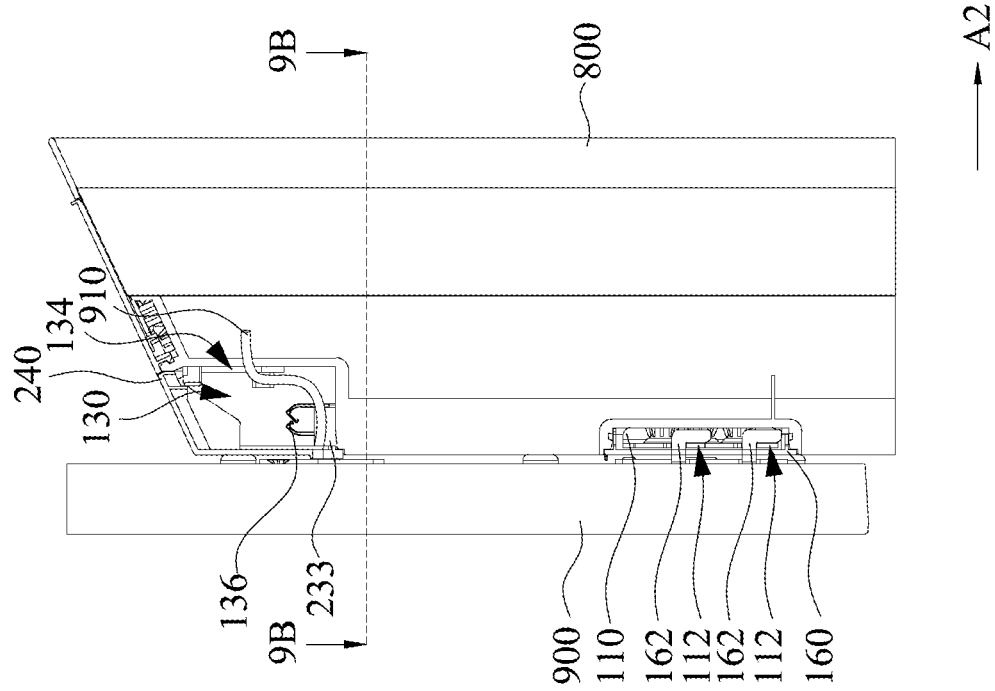
FIG. 9A is a sectional view of the fixing device of FIG. 6B.
Figure 9B:
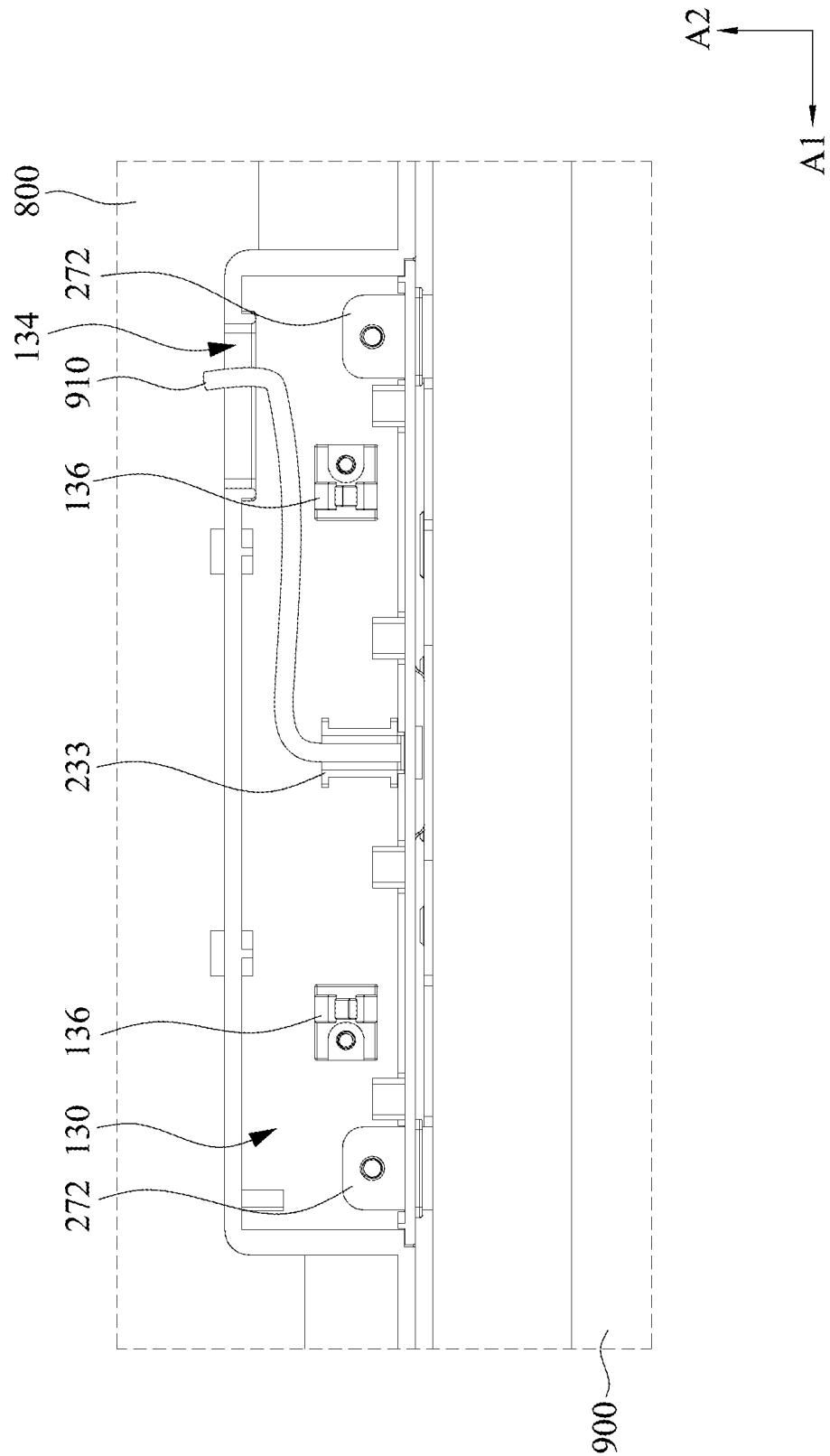
FIG. 9B is a sectional view along the sectional line 9B-9B in FIG. 9A.

FIG. 9A is a sectional view of the fixing device 100 of FIG. 6B. FIG. 9B is a sectional view along the sectional line 9B-9B in FIG. 9A. Reference is made to FIG. 6B, FIG. 9A and FIG. 9B. When the first housing 800 and the second housing 900 are assembled as the second position, the second surface 800S2 of the first housing 800 abuts against the third surface 900S of the second housing 900. To be specific, the pads 930 located on the third surface 900S contact with the second surface 800S2. The pads 930 can provide cushioning, such that the second surface 800S2 and the third surface 900S do not rub against each other, and the weight of the second housing 900 is assisted to be evenly distributed on the second surface 800S2. When the hooks 162 respectively extend into the second fixing holes 122, the extension arms 272 penetrate into the accommodation room 130 through the through holes 242. To be specific, the hooks 162 of the first embedded piece 160 are correspondingly embedded into the second fixing holes 122 of the second fixing piece 120. In this embodiment, the way of assembly is the same as the way discussed in FIGS. 5A and 5B. When the first fixing piece 110 and the first embedded piece 160 are assembled, the extension arms 272 extend into the accommodation room 130 at the same time and correspond to the locations of the inner-side fixing holes 238. In this embodiment, the inner-side fixing holes 238 and the extension arms 272 can be fixed by screws. The cable 910 extends into the accommodation room 130 and penetrates through the trough 233 and then finally enters into the cable hole 134 to electrically connect with electronic elements in the first housing 800 and the second housing 900. After the cable 910 and the extension arms 272 are fixed, the first cover 240 is used to cover the accommodation room 130, and the assembly of the first housing 800 and the second housing 900 as the second position is completed. It is worth to note that, in the assembly as the second position, the first fixing piece 110 is covered by the second cover 182, to prevent the first fixing piece 110 from contacting with water or other liquids. In the assembly as the second position, the first housing 800 and the second housing 900 can be disposed on a wall. For example, the first housing 800 can be fixed on a wall. In this way, the first housing 800 and the second housing 900 can be used as a wall-mounted screen.

In conclusion, the aforementioned embodiments of the present disclosure have at least the following advantages: through the matching of the first fixing piece, the second fixing piece, the accommodation room disposed on the first housing and the first embedded piece and the second embedded piece disposed on the second housing, the first housing and the second housing can be assembled with each other as the first position or the second position. In the assembly as the first position, the first housing and the second housing are suitable to be placed on a table. At this point, the first surface of the first housing abuts against the second housing. Since there is an included angle between the first surface and the second surface, when the second housing includes a display screen, this included angle helps a user to read the screen information or operate the screen. In the assembly as the second position, the first housing and the second housing are suitable to be disposed on a wall. At this point, the second surface of the first housing abuts against the second housing. When the first housing is disposed on a wall while the second housing includes a display screen, the first housing and the second housing can be used as a wall-mounted screen. In either assembly as the first position or the second position, the hooks of the first embedded piece can be embedded into the fixing holes of the first fixing piece or the second fixing piece. The second embedded piece is embedded into the accommodation room. Moreover, the accommodation room can be used to accommodate the cable, and the electronic elements respectively located in the first housing and the second housing can be electrically connected by the cable. On the other hand, the first cover and the second cover of the fixing device respectively cover the accommodation room exposed and the first fixing piece, the second fixing piece. In this way, the cable in the accommodation room can be prevented from contacting with water or other liquids, which may otherwise cause short circuit.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A fixing device, comprising:
   a first fixing piece disposed on a first surface of a first housing, the first fixing piece comprising a plurality of first fixing holes;
   a second fixing piece disposed on a second surface of the first housing, the second fixing piece comprising a plurality of second fixing holes;
   an accommodation room disposed on an edge adjacent to the first surface and the second surface, the accommodation room comprising an opening extending on the first surface and the second surface;
   a first cover covering the opening, the first cover comprising a plurality of through holes;
   a first embedded piece disposed on a third surface of a second housing, the first embedded piece comprising a plurality of hooks; and
   a second embedded piece disposed on the third surface, the second embedded piece comprising an extension arm,
   wherein when the hooks respectively extend into the first fixing holes or the second fixing holes, the extension arm penetrates into the accommodation room through the through holes.

2. The fixing device of claim 1, wherein the second housing further comprises:

a cable penetrating into the accommodation room through one of the through holes and penetrating into the first housing through a cable hole of the accommodation room.

3. The fixing device of claim 2, wherein the accommodation room further comprises:

a plurality of flexible fixing columns disposed in the accommodation room and clamping the cable.

4. The fixing device of claim 1, wherein when the second housing and the first housing are assembled as a first position, the hooks of the first embedded piece extend into the first fixing holes, and the extension arm extends into the accommodation space from the through holes located on the first surface.

5. The fixing device of claim 4, wherein the extension arm is fixed in the accommodation room and on an inner surface adjacent to the first surface.

6. The fixing device of claim 4, further comprising:

a second cover, the second fixing piece is covered by the second cover.

7. The fixing device of claim 1, wherein when the second housing and the first housing are assembled as a second position, the hooks of the first embedded piece extend into the second fixing holes, and the extension arm extends into the accommodation space from the through holes located on the second surface.

8. The fixing device of claim 7, wherein the extension arm is fixed in the accommodation room and on an inner surface adjacent to the second surface.

9. The fixing device of claim 7, further comprising:

a second cover, the first fixing piece is covered by the second cover.

10. The fixing device of claim 1, wherein an included angle between the first surface and the second surface is larger than 90 degrees.

* * * * *